Patented Nov. 27, 1945

2,389,873

UNITED STATES PATENT OFFICE 2,389,873

PREPARATION OF BASIC HEAVY-METAL SOAPS

Harold Schiller, Los Angeles, Calif., assignor to Socony-Vacuum Oil Company, Incorporated, New York, N. Y., a corporation of New York No Drawing. Application May 15, 1944, Serial No. 535,760

2 Claims. (Cl. 260—429)

The instant application is a continuation-in-part of my copending application entitled "Aluminum mononaphthenate and kindred compounds," filed December 2, 1943, Serial No. 512,662.

The invention comprises a generalized procedure for the production of the basic salts of numerous divalent and trivalent metals with fatty and naphthenic acids. These salts have the general formulae M'(OH)R where M' is a divalent metal, and M''(OH)₂R where M'' is a trivalent metal, R being the radicle of a fatty or naphthenic acid.

The salts or soaps of the heavy metals which have heretofore been available have been of two general types: the normal soaps having the general formulae M'R₂ for the divalent and M''R₃ for the trivalent metals, prepared by double decomposition in aqueous solution between alkali-metal soaps and water-soluble salts of the desired metal, and soaps containing more than one equivalent of the metal but less than the quantity present in the basic soap, prepared by heating the fatty or naphthenic acid with the hydroxide, oxide or carbonate of the metal.

The advantages of the basic compounds over the soaps heretofore available are found: (1) in a higher content of the metal; (2) in availability in the form of incoherent granules or powders; (3) in freedom from excess acids, reaction by-products, unreacted oxides and water.

The process will most readily be understood by considering it as divided into the following steps, applied seriatim:

*First.*—The precipitation of the hydroxide of the preferred metal from a solution of one of its water-soluble salts by the addition of an alkali-metal hydroxide;

*Second.*—The addition of an alkali-metal soap of the preferred soap-forming organic acid;

*Third.*—The precipitation of the organic acid by the addition of a stronger acid, resulting in the adsorption of the liberated organic acid on the extended surfaces of the freshly precipitated hydroxide particles;

*Fourth.*—The separation, washing and drying of the hydroxide with its adsorbed film of organic acid; the combination of the acid with the hydroxide to form the basic heavy-metal soap occurring during the drying step.

When carried out with suitable precautions, which will be described in detail, the above procedure results, at the end of the third step, in a light, incoherent, powdery or flocculent precipitate which may be washed free from reaction products and excess reagent with the greatest ease, which may readily be filtered from the wash water, and which does not coalesce during the ensuing drying step.

The following examples of the technical application of the process should precede a discussion of the theory and of the precautions to be taken.

EXAMPLE 1.—COPPER MONO-NAPHTHENATE 250 parts (one mol weight or two equivalent) of cupric sulfate CuSO₄.5H₂O are dissolved in about 2000 parts water and the copper is precipitated as hydroxide by stirring in an aqueous solution of 100 parts sodium hydroxide.

In a separate vessel, 400 parts (two equivalents) of naphthenic acids (acid number 280) in 2000 parts water are saponified with 100 parts sodium hydroxide. The two solutions are now combined, the resulting mixture containing 2 equivalents copper hydroxide Cu(OH)₂
2 equivalents sodium naphthenate
1 equivalent excess sodium hydroxide a dilute (about 5%) solution of sulfuric acid is slowly added to this mixture, with vigorous agitation, until the excess sodium hydroxide is neutralized. Up to this point there is no apparent adsorption reaction. As the reaction between acid and excess alkali nears completion, there is, however, a definite inflection of the pH curve. On further addition of acid, the pH maintains itself at about 10.0 until sufficient has been added to neutralize one equivalent of sodium naphthenate. At this point there is developed another inflection of the pH curve, indicating the formation of an adsorption product organic acid adsorbed on the surfaces of solid hydroxide particles in which the ratio of copper to naphthenic acids is equimolecular. Maximum inflection occurs at about pH 9.0.

The reaction product may now be filtered from the mother liquor, washed with water and dried. Drying may be carried out in any conventional manner, provided the temperature does not greatly exceed 140° Fahr. The final product is a dark green, highly porous, dry cake which readily crumbles to a powder.

The filtrate of mother liquor contains two equivalents sodium sulfate and one equivalent sodium naphthenate. The naphthenic acid may be recovered by acidification in the usual manner.

The product, copper mono-naphthenate, having the formula Cu(OH)Nap, is an amorphous green powder containing about 22.7 per cent by weight of copper, dry basis. It is soluble in benzene, petroleum solvents, chlorinated hydrocarbons, alcohols, ketones, terpenes and similar non-polar solvents. It is also soluble in amines and in aqueous ammoniacal or amine solutions but is insoluble in water.

EXAMPLE 2.—ALUMINUM MONO-OLEATE 333 parts aluminum sulfate $Al_2(SO_4)_3.18H_2O$ are dissolved in about 2000 parts water and the aluminum is precipitated as the hydroxide by stirring in an aqueous solution of 140 parts sodium hydroxide.

In a separate vessel, 280 parts (one equivalent) of oleic acid are saponified with 60 parts sodium hydroxide. The two solutions are then combined, the resulting mixture containing:

3 equivalents aluminum hydroxide $Al(OH)_3$
1 equivalent sodium oleate
1 equivalent excess sodium hydroxide The dispersion of aluminum hydroxide in the solution of sodium oleate and sodium hydroxide is vigorously agitated while a dilute hydrochloric acid (about 5%) solution is slowly added until the excess alkali is neutralized. At this juncture there is an inflection in the pH curve. Further addition of acid causes no great change in pH until sufficient has been added to neutralize the sodium oleate present. At this point is approached there is a marked decrease in pH, and at about pH 7 to pH 8 the reaction is complete.

The adsorption product formed contains three equivalents aluminum to one equivalent oleic acid. After separation from the mother liquor, washing and drying it forms a white, fluffy mass of granules.

Aluminum mono-oleate has the empirical formula $C_{17}H_{33}COOAl(OH)_2$. It is moderately soluble in alcohol, is insoluble in water, and disperses in hydrocarbons to form greases. In the incoherent granular form produced by this method the dispersion is much more rapid than in the handling of the normal trioleate.

EXAMPLE 3.—MAGNESIUM MONO-NAPHTHENATE 246 parts magnesium sulfate $MgSO_4.7H_2O$ are dissolved in about 2000 parts water and the hydroxide is precipitated by the addition of an aqueous solution of 100 parts sodium hydroxide.

In a separate vessel, 400 parts of naphthenic acids (acid number 280) are saponified with 100 parts sodium hydroxide. The two solutions are then combined, the resultant mixture containing:

2 equivalents magnesium hydroxide $Mg(OH)_2$
2 equivalents sodium naphthenate
1 equivalent excess sodium hydroxide A diluted strong acid is added to this mixture as described in the previous examples. The excess alkali is first neutralized, after which the sodium naphthenate is progressively decomposed with the liberation of naphthenic acids, which in turn are adsorbed on the dispersed hydroxide. In the case of magnesium, however, the precipitation range of the hydroxide is of a higher pH than the neutralization range of the naphthenate, magnesium hydroxide being a relatively strong base. There is thus no inflection in the pH curve at the point of completion of the reaction producing magnesium mononaphthenate. Addition of mineral acid beyond this point results in the progressive conversion of the mono- to the di-naphthenate without marked pH change until the conversion nears completion. Therefore, in the case of magnesium, the amount of dilute acid added must be carefully measured. In this example, a total of 98 parts sulfuric acid may be used; 49 parts to neutralize the excess sodium hydroxide and 49 parts to release one equivalent naphthenic acid.

The adsorption product may be filtered from the mother liquor, washed and dried as described above. The product, magnesium mono-naphthenate, has the formula $Mg(OH)Nap$ and after drying is a white or amber mass of crumbly consistency. It is readily soluble in organic solvents but insolvent in water.

Basic soaps of divalent metal ions, such as nickelous, manganous, zinc, lead, cobaltous, cadmium, mercuric and uranyl ions may be prepared in the manner described for copper. Basic soaps of trivalent metal ions, such as ferric, manganic, chromic and ceric ions may be prepared according to the method described for aluminum.

Basic soaps of the above metals with other acids, such as abietic, stearic, palmitic, lauric, linolic, linoleic, etc. may be produced by substituting the alkali-metal soap of the preferred acid for the sodium oleate or naphthenate in any of the above examples. Potassium may be substituted for sodium in the preparation of any of the soluble soaps.

THEORETICAL CONSIDERATIONS

The method herein described differs so radically from techniques heretofore used that it is necessary to discuss the theory and the probable reactions involved, though it will be understood that I do not limit my invention thereby.

I have discovered that when a metallic hydroxide is precipitated, say from a solution of its chloride or its sulfate, by the addition of an alkali-metal hydroxide, and if to such precipitate, mechanically dispersed in water, there is added an alkali-metal salt of a naphthenic, fatty or rosin acid, no reaction occurs so long as the pH of the mixture is greater than 11. But as a dilute solution of a mineral acid, such as sulfuric acid, is slowly added to the vigorously stirred mixture, a reaction occurs. It is believed that the following takes place:

(1) At pH greater than 11 the aqueous mixture contains the metallic hydroxide and the alkali-metal soap;

(2) The addition of dilute mineral acid liberates from the soap a corresponding quantity of the free organic acid;

(3) The liberated organic acid does not form a separate phase, but becomes uniformly adsorbed on the extensive surface of the freshly precipitated and highly hydrated metallic oxide;

(4) After the removal of excess water and reagents and of reaction by-products, and during the removal of the water of hydration in drying, the adsorbed organic acid enters into combination with part of the hydroxide to form the heavy-metal soap.

Although the reaction with the added acid will proceed normally when reaction equivalent amounts of heavy-metal hydroxide and soluble soap are present, it is only with great care and extremely slow addition of the mineral acid that a product free from unreacted hydroxide may be obtained. Under such conditions, as the reaction approaches completion the concentration of alkali-metal soap sharply decreases and the dispersed reaction product tends to agglomerate into large particles. The formation of these agglomerates prevents normal reaction between the final increments of adsorbed organic acid and unreacted heavy-metal hydroxide which may be ncluded within the mass of a large particle of adsorption product.

In order to allow the reaction to go more nearly or quite to completion, it is useful to employ an excess of the alkali-metal soap, as illustrated in Examples 1 and 3 above. At the end of the adsorption reaction, three desirable features result from the use of such an excess. First, the residual unreacted alkali-metal soap maintains the adsorption product in a finely dispersed state, thus facilitating the distribution of liberated organic acid over the surfaces of the hydroxide particles. Second, the pH is buffered by the unreacted alkali-metal soap in the region of the alkali-metal soap-alkali-metal hydroxide inflection. Third, the probability of localized extreme reduction in pH during neutralization is minimized.

It should be stated, however, that the use of the large excess of soluble soap set forth in Examples 1a and 3 is not necessary to the successful practice of the method, but is merely an excess which has been found useful and desirable in commercial operation. The theoretical quantity—one equivalent of the soluble soap to two equivalents of a bivalent or three equivalents of a trivalent metal, is the irreducible minimum consistent with a product free from unreacted heavy-metal hydroxide, but above this minimum any excess of soluble soap which, in any specific instance, produces the most desirable result as to facility of operation, may be used.

It is my belief that the product obtained at the end of the mineral acid addition is not a chemical compound of the metal with the organic acid but, as stated above, is simply the hydrated heavy-metal hydroxide with adsorbed organic acids, and that the heavy-metal soap is formed only as the water of occlusion, hydration and reaction is removed.

There is evidence, however, that the reaction is something more than a simple physical adsorption. For example, in the case of the formation of copper naphthenate with two equivalents of alkali-metal soap present, there occurs a distinct inflection of the pH curve at the point at which only one of the equivalents of organic acid has been liberated to form the adsorption product. This phenomenon suggests the formation of a definite chemical compound, which is in equilibrium with the reaction mixture, at the point where the composition of the precipitate corresponds to that of the mononaphthenate. If such compound is formed, however, its stability when highly hydrated must be quite low, as the mononaphthenic adsorption product, freed from excess water but not dried, partially dissociates into heavy-metal hydroxide and free organic acid when dispersed in a nonaqueous solvent.

The nature of the reaction which takes place when mineral acid is added to the suspension of heavy-metal hydroxide in alkali-metal soap solution (the third stage of the process) is believed to be represented by the following equation:

$$nH_2O—M—(OH)_x + NaAc + H^+ \rightarrow nH_2O—M—(OH)_x.HA + Na^+$$

in which $nH_2O$ represents the water of hydration of the heavy-metal hydroxide
M represents the heavy metal
NaAc represents the alkali-metal salt of the desired organic acid
$H^+$ represents the hydrogen ions from the mineral acid used
$nH_2O—M—(OH)_x.HAc$ represents the adsorption product When an excess of alkali-metal soap is used, the reaction is substantially the same, the excess being unused, thus:

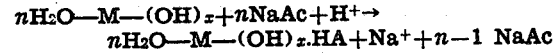

And the reaction which occurs during the final drying step is believed to be as follows:

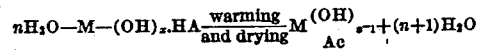

It is not likely that the actual reactions are as simple as those indicated above, which should be understood to represent over-all effects only.

VARIABLES

The known variables which affect the nature of the final product are as follows:

A. Properties of the heavy-metal hydroxide

Not all metals form hydroxides which are suitable to the described method. Those metals which have been tested and found suitable are of two types: (a) divalent metals whose hydroxides have precipitation ranges above about pH 6, and (b) trivalent metals whose hydroxides are formed in the range of pH 3.5 or over. In the first group are found magnesium, zinc, copper, lead, cadmium, nickel, cobalt, manganese and mercury; the second group includes iron, aluminum, chromium and cerium. These lists probably do not include all metals which are functional, though it is likely that they include all which are of commercial utility.

The adsorption products resulting from the addition of mineral acids form at different pH levels for the different heavy-metal hydroxides and, therefore, the end point of the adsorption reaction lies at a different pH value for each metal. For any given metal, this pH level will vary to some extent with (1) the concentration of reactants, (2) the operating temperature, (3) the specific organic acid, (4) the nature of the anion of the salt from which the hydroxide was derived, and (5) impurities or other polyvalent metal hydroxides which may be present.

B. Properties of the organic acid used

The selection of organic acid will affect the conditions of the reaction in the following ways:

(a) As the dissociation constant of the acid increases, the pH at the end point of the adsorption reaction is lowered. However, with the type of acids for which the procedure is intended, i. e., naphthenic, abietic, stearic, oleic, palmitic, lauric, linolic, linoleic, etc., the pH at the end point of the adsorption reaction generally lies on a narrow range in the region of pH 9;

(b) As the melting point of the acid used decreases, the softening temperature of the basic naphthenate obtained as the final product is lowered;

(c) As the proportion of unsaponifiable matter in the organic acid increases, there is a correspondingly increased tendency toward stickiness of the final product.

C. Molecular ratio of heavy-metal hydroxide to organic acid

In order to form the basic soaps of divalent metals, two equivalent weights of the metal are used for one equivalent weight of organic acid liberated. To form the dibasic soaps of trivalent metals, three equivalent weights of the metal are used to each equivalent of liberated organic acid. If the metal hydroxide is present in slight excess, the resulting basic soap will contain this excess of hydroxide as an impurity. If an excess of organic acid be liberated, this excess will be distributed between the dispersed adsorption product and solution in the mother liquor, depending upon the pH at which the end point of the adsorption reaction occurs.

With minor excesses of hydroxide, the product tends to asume a more powdery form when dried; with minor excesses of organic acid the final product tends toward tackiness. Slight deviations from theoretical quantities required for making the basic soaps may be judiciously allowed to obtain desired properties in the final product.

D. Concentration of reactants in aqueous dispersion medium

The concentration of reactants is not a critical condition of the reaction. The concentration found to be most convenient in practical operations is that which produces from 0.5 pound to one pound of the final product per gallon of water.

E. Extent of neutralization with mineral acid

If insufficient mineral acid is added to the dispersion of hydroxide in alkali-metal soap solution, some of the soluble soap will remain unconverted and will be lost in the final filtration, and the finished product will contain a corresponding amount of unreacted heavy-metal hydroxide. If excess mineral acid is added, the product will contain free organic acids and will be tacky, while metal ions will be lost in the mother liquor.

The nature of the "mineral" acid used in this step is of secondary importance. It should have a dissociation constant not below $1 \times 10^{-5}$ in order to decompose the alkali-metal soap, and should be freely water-soluble. Strongly oxidizing acids such as nitric, would not be desirable. Ordinarily sulfuric, phosphoric, or hydrochloric acid, strongly diluted, would be used.

F. Temperature at which acidification is performed

In some cases the temperature at which the adsorption takes place has a marked bearing on the nature of the final product. In the formation of basic copper naphthenate, for example, acidification at room temperature yields a blue-green product while operation at about 180° Fahr. yields a black precipitate. In general practice, the conduct of the acidification and adsorption at room temperature yields the desired product.

G. Extent of dehydration

The extent to which the adsorption product is dehydrated is an important feature of the process. Inadequate dehydration allows some of the product to remain as the adsorption compound. On solution in a solvent such as a petroleum distillate, the unreacted organic acids quickly dissolve in the solvent and are thus separated from the unreacted heavy-metal hydroxide, which remains as a (usually) objectionable residue. Ordinarily about sixteen hours drying at 130° to 140° Fahr. will be found adequate.

H. Temperature used in dehydration

The temperature at which dehydration is conducted may, in the case of some metals, influence the final properties. With most of the basic metal soaps prepared by this method, decomposition occurs if drying temperatures are carried to 212°. Some of these soaps, notably those of copper and cobalt, show marked color changes if dried in the region of 180° Fahr. It is desirable to restrict the drying temperature to a maximum of 140° Fahr. unless experience shows that a higher temperature may be tolerated in a specific instance.

I. Mechanical agitation during acidification

It is necessary to maintain very vigorous agitation of the hydroxide dispersion during the addition of the dilute mineral acid. Inadequate agitation results in excessive local acidity at points where drops of acid come into contact with the precipitate. As a consequence of high local acidity, free organic acid is released in a form which agglomerates the precipitate into nodules which, subsequently, are very difficult to redisperse.

J. Time factor

In the case of at least some of the heavy metals, aging of the precipitate of hydroxide causes a severe decrease in reactivity with the soap-forming acids. If a precipitate of aluminum hydroxide, for example, is allowed to stand for even a few hours before the organic acid is liberted in contact with it, the liberated acid may be adsorbed but it will fail to react completely with the hydroxide during the drying step and the final product will be sticky and only partially soluble in organic solvents. It is essential to proceed with the addition of the alkali-metal soap solution and its acidification with mineral acid as soon as possible after the precipitation of the heavy-metal hydroxide.

The process herein disclosed is advantageous over the wet methods of the prior art in the ease and rapidity with which it may be conducted and the certainty of the result obtained; in entire freedom from any risk of emulsification; in the filterability of the adsorption product, and in the ease with which complete removal of all water soluble contaminants may be removed by water-washing of the filter cake in the press.

The products of the invention are adapted to all types of use to which the corresponding heavy-metal soaps of the prior art have been put: for example, as siccatives; as toxic agents in fungicides and insecticides; as bactericides in the protection of wood and fabrics, and in the compounding of greases and highly viscous oils. In these various uses the new products will be found advantageous over those of the prior art: in freedom from water, reaction by-products and unreacted materials; in complete and ready solubility in organic solvents, usually at much reduced temperatures; in a granular or powdery and free-flowing consistency which renders them easy to handle and to measure, and in improved color, the latter of particular importance in siccatives. Their prime advantage, however, is usually found in a higher content of the metal than has heretofore been attained.

I claim as my invention:

1. The method of preparing a basic soap of a metal of which the hydroxide is water-insoluble, which comprises: preparing a suspension of the freshly precipitated hydroxide of said metal in an aqueous solution containing an alkali-metal soap of a soap-forming organic acid and an excess of a water insoluble alkali-metal hydroxide, said suspension containing not less than one molecule of said soap to one molecule of said insoluble hydroxide; adding to said suspension, with agitation, a highly diluted, strong acid in quantity sufficient to neutralize said excess alkali and to liberate only one molecule of said organic acid from said soap; separating from said suspension a water-insoluble phase containing unreacted insoluble hydroxide together with said liberated organic acid; substantially freeing said separated phase from water-soluble substances, and dehydrating said separated phase.

2. The method of preparing a basic soap of a metal which forms a water-insoluble hydroxide in the range above pH 3.5 which comprises: preparing a suspension of the freshly precipitated hydroxide of said metal in an aqueous solution of an alkali-metal soap of a soap-forming organic acid and an excess of a water-soluble alkali-metal hydroxide, said suspension containing not less than one molecule of said soap to one molecule of said insoluble hydroxide; neutralizing said excess alkali and liberating from said soap, in contact with said suspended hydroxide, a number of molecules of said organic acid not exceeding the valence number of said metal less 1 by intermixing with said suspension a water-soluble acid; separating water and water-soluble substances from a moist composite of water-insoluble substances comprising said insoluble hydroxide and said liberated organic acid, and completing reaction between said hydroxide and said liberated acid by substantially dehydrating said composite.

HAROLD SCHILLER.